United States Patent [19]
Bingley

[11] Patent Number: 5,896,281
[45] Date of Patent: Apr. 20, 1999

[54] POWER CONDITIONING SYSTEM FOR A FOUR QUADRANT PHOTOVOLTAIC ARRAY WITH AN INVERTER FOR EACH ARRAY QUADRANT

[75] Inventor: Donald W. Bingley, Carlisle, Mass.

[73] Assignee: Raytheon Company, Lexington, Mass.

[21] Appl. No.: 08/887,342

[22] Filed: Jul. 2, 1997

[51] Int. Cl.$^6$ .................................................. H02M 7/00
[52] U.S. Cl. .................................................. 363/71; 307/77
[58] Field of Search .................. 363/65, 71; 307/77, 307/82

[56] References Cited

U.S. PATENT DOCUMENTS

| | | | |
|---|---|---|---|
| 4,404,472 | 9/1983 | Steigerwald | 307/46 |
| 4,454,371 | 6/1984 | Folino | 136/246 |
| 4,591,965 | 5/1986 | Dickerson | 363/43 |
| 4,680,690 | 7/1987 | Dickerson | 363/43 |
| 4,878,208 | 10/1989 | Seki et al. | 307/87 |
| 4,894,764 | 1/1990 | Meyer et al. | 363/65 |
| 4,922,124 | 5/1990 | Seki et al. | 307/87 |
| 4,980,574 | 12/1990 | Cirrito | 307/21 |
| 5,027,051 | 6/1991 | Lafferty | 323/906 |
| 5,293,447 | 3/1994 | Fanney et al. | 392/449 |
| 5,337,227 | 8/1994 | Stacey et al. | 363/71 |
| 5,446,643 | 8/1995 | McMurray | 363/71 |
| 5,453,643 | 9/1995 | Yang | 363/132 |

OTHER PUBLICATIONS

Wasynesuk, O., "Modeling and Dynamic Performance Of A Line–Commutated Photovoltaic Inverter System", IEEE Transaction on Energy Conversion, vol. 4, No. 3, Sep. 1989, pp. 337–343.

Bhat, A. et al., "A Novel Utility Interfaced High–Frequency Link Photovoltaic Power Conditioning System", IEEE Transaction on Industrial Electronics, vol. 35, No. 1, Feb. 1988, pp. 153–158.

Carroll, D. et al., "Dynamic Simulation of Dispersed Grid–Connected Photovoltaic Power Systems: Task 1—Modelling and Control", Contractor Report, SAND83–7018 Unlimited Release, UC–63, Nov. 1983, pp. iii–118.

Primary Examiner—Shawn Riley
Attorney, Agent, or Firm—Nutter, McClennen & Fish, LLP; Judith C. Crowley

[57] ABSTRACT

A photovoltaic (PV) power system having distributed square wave current DC to AC inverters integral with strings of PV cells in a PV array. The PV array is arranged into four quadrants and phase-shifted and summed AC voltages from each quadrant are further summed in a 12-phase to 3-phase transformer to produce a sinusoidal 3-phase AC voltage with a total harmonic distortion of less than 5 percent.

16 Claims, 5 Drawing Sheets

POWER CONDITIONING SYSTEM FOR A FOUR QUADRANT PHOTOVOLTAIC ARRAY WITH AN INVERTER FOR EACH ARRAY QUADRANT

BACKGROUND OF THE INVENTION

This invention relates to a photovoltaic (PV) power system and in particular to an improved method and apparatus for converting DC power to AC power for introduction to a utility grid.

The prior art teaches subjecting a photovoltaic array to solar radiation for generating electrical power for a variety of purposes. In U.S. Pat. No. 5,293,447, issued Mar. 8, 1994, to Fanney et al., there is shown a photovoltaic Solar Water Heating System where solar energy is collected and centrally combined where it is converted to electrical energy for heating a water tank.

The prior art also teaches generating electrical power for a utility grid. Photovoltaic arrays produce a DC voltage which is collected and centrally combined and then converted to an AC voltage by a complex power inverter for use on the utility grid. Existing PV power systems differ mainly in the style of PV module mounting. There are passive PV arrays and tracking PV arrays. The tracking arrays have had varying degrees of reliability problems associated with the tracking mechanisms. The problems with passive arrays have been primarily related to the DC connections of the panels.

In U.S. Pat. No. 4,591,965, issued May 27, 1986, to Dickenson, there is shown an inverter for converting direct current (DC) produced by several photovoltaic solar arrays to a polyphase alternating current (AC). Direct current generated by the PV arrays is applied to switching poles which connect the applied direct current to three lines $V_A$, $V_B$, and $V_C$. No two of the arrays supply current to the same AC line and the current generated by each of the arrays is applied to some one of the AC lines as a result of an inverter switching action.

In U.S. Pat. No. 4,922,124 issued May 1, 1990 to Nagataka Seki et al., power converter device comprising a plurality of self-commutated voltage type inverters is disclosed wherein each input of the inverters is connected to a common DC circuit and the outputs of each inverter are connected to designated windings of transformers which have AC windings arranged in a zigzag connection; serially connected AC windings of the transformers are connected to a utility power system via AC switches. Seki et al. teach effective means of preventing DC overvoltage and preventing excess transient voltage when the transformer units are connected to utility power systems by synchronous making. However, the power converter device of Seki et al. is complex requiring control of DC sources which requires resistors for discharging capacitors, and to absorb regenerative energy resulting in reduced efficiency. Seki also requires a DC overvoltage suppression device on AC switch for controlled connection of AC windings, deliberate sequencing of the multiple self-commutated voltage type converters, an auxiliary charging circuit and a particular start-up sequence.

Figures 1, 2:
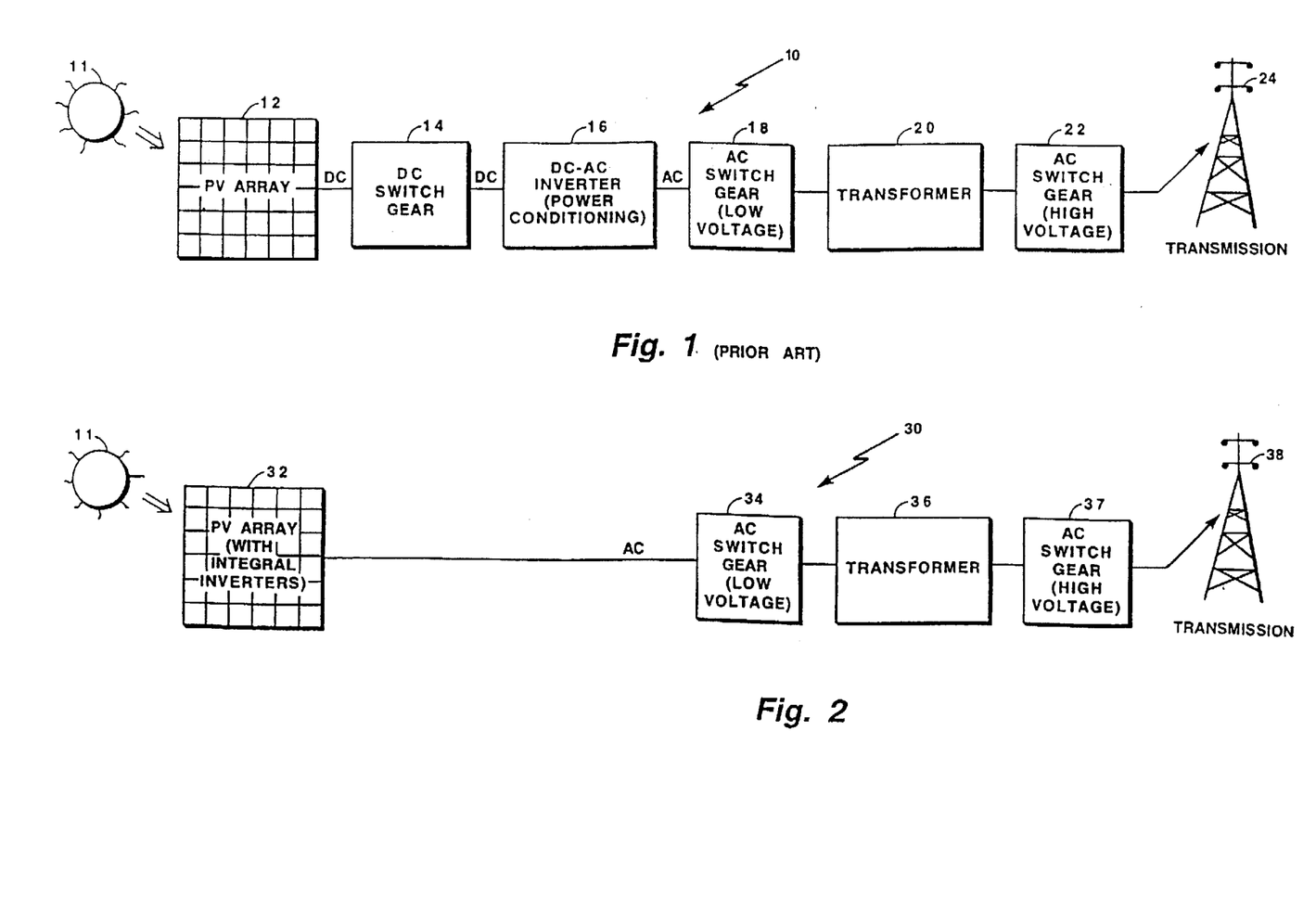
FIG. 1 is a system block diagram of a photovoltaic power station as known in the prior art.
FIG. 2 is a system block diagram of a photovoltaic power station according to the invention.

FIG. 1 shows a system block diagram of a photovoltaic power station as known in the prior art. A PV array 12 receives solar radiation from the sun 11 and converts the solar energy into electrical energy in the form of direct current. The DC is collected by DC switch gear 14 and fed to a DC-AC inverter 16 which converts the DC to three-phase AC. The AC is coupled to AC switch gear 18 for control of low voltages and then the AC is fed to a transformer 20 which generates a high voltage three-phase AC. AC switch gear 22 is coupled to the three-phase outputs of the transformer 20 and such three-phase outputs are fed via the switch gear 22 to high voltage transmission lines 24. A key requirement for connection of a PV power station to the utility grid is that the current waveform of the power being delivered have no more than a total harmonic distortion (THD) of 5% with no individual harmonic having a magnitude of greater than 3% with respect to the fundamental current.

In the PV power station as shown in FIG. 1, the single DC to AC inverter 16 represents a single point failure and needs to switch at high frequency, and use pulse width modulation to meet the total harmonic distortion requirements. The DC power for the array 12 is connected via a significant amount of wiring contained generally in underground trunks and then the DC wiring is all combined in DC switch gear 14. A DC voltage has problems associated with plating action experienced when an electrolyte is subjected to a steady DC potential, creating a plating current in the electrolyte. The resulting plating action causes an ever reinforced plated path to ground caused by the material removed from the conductor (wire or connector) by this action. Eventually a ground fault results in the system, and there is additional concern for potential open circuit failure of the wiring or connector as a result of loss of material due to the plating action. An electrolyte is naturally formed with moisture from condensation including rain and materials found in dirt and dust. Rainwater will often be an electrolyte when mixed with air pollutants causing, for example, an electrolyte such as acid rain. In addition, there are many other problems with the present technology as illustrated in FIG. 1 ranging from the DC to AC inverters being complex and very expensive to EMI/RFI issues exacerbated by high frequency switching circuits.

Because PV energy is low density for utility scale power, a power station may cover several acres. Hence, the wire for collection of the power from the PV array is extensive and represents a significant opportunity for the problems described above for DC wiring to occur. All these problems identified with the prior art PV power station are overcome by the present invention.

Further, in the prior art high frequency switching inverters need filters to take care of EMI/RFI and waveform purity. These filters create uncertainties in installations with a utility grid due to Kilo Volt Amp Reactive (KVAR) generation that needs to be provided by the utility; also there are unpredictable interactions with the system that is being connected to, with respect to resonances being formed between the system reactance and the filters. The present invention overcomes the problems and disadvantages of the prior art described hereinbefore.

SUMMARY OF THE INVENTION

Accordingly, it is therefore an object of this invention to provide distributed DC to AC inverters of a photovoltaic (PV) power system integral with each output of a PV string of cells in a PV array, thereby eliminating a single point failure condition.

It is a further object of this invention to arrange the PV array into four quadrants with 3φ AC outputs displaced by 15 degree increments with respect to the other quadrant outputs in order to equally load the four 3φ windings on the 12φ to 3φ transformers to maximize the cancellation of harmonics in the 12φ to 3φ transformer.

It is a further object of the invention to utilize the inherent current limiting characteristic of PV cells to enable application of rudimentary 3φ square wave current inverters resulting in a sinusoidal current provided to a utility line of less than 5% THD.

It is a further object of the invention to use the voltage at the connection of the inverters to the 12φ to 3φ transformer to automatically synchronize the inverter output to a utility line voltage.

It is a further object of this invention to provide power collection of three-phase AC voltages and not DC voltages in order to minimize DC wiring.

These and other objects are accomplished by providing a photovoltaic (PV) array including embedded power conditioning comprising a plurality of PV cells arranged in four quadrants of the array, each of the quadrants comprises at least one string of the PV cells for generating a DC voltage, each string of the PV cells comprises inverter means connected to the string DC voltage for converting the DC voltage to three-phase AC current outputs, and means coupled to the output of the inverter means for summing the three-phase AC current outputs from each quadrant and forming a three-phase AC high voltage output. The inverter means comprises a square wave inverter, which generates a square wave current having a dwell time at the zero cross-over point of the AC voltage outputs of 60 electrical degrees. The square wave inverter means utilizes inherent current limiting of the PV cells to enable connection to an AC voltage source. The summing means comprises a twelve-phase to three-phase transformer. The transformer comprises windings for phase shifting by 15 electrical degrees the three-phase AC current outputs from each quadrant with respect to the other quadrants. The twelve-phase to three-phase transformer provides for summing and canceling harmonic currents in square wave currents generated by the inverter means. The circuit breaker means comprises a first breaker means provided for each of the three-phase AC current outputs of each quadrant and a second breaker means connected to a combination of the three-phase AC current outputs of the corresponding quadrant after passing through the first breaker means.

The objects are further accomplished by providing a power system comprising a photovoltaic (PV) power source, the photovoltaic power source comprises an array of PV cells arranged in four quadrants of said array, each of the quadrants comprises at least one string of the PV cells for generating a DC voltage, each string of the PV cells comprises inverter means connected to the string DC voltage for converting the DC voltage to three-phase AC current outputs, circuit breaker means coupled to each of the three-phase AC current outputs from each inverter means in each quadrant of the PV array for protecting each string of the PV array, and means coupled to the circuit breaker means for summing the three-phase AC current outputs from each quadrant and forming a three-phase AC high voltage output of the power system. The inverter means comprises a square wave inverter. The inverter means generates a square wave current having a dwell time at a zero cross-over point of the AC current outputs of 60 electrical degrees. The square wave inverter means utilizes inherent current limiting of the PV cells for connection to an AC voltage source. The summing means comprises a twelve-phase to three-phase transformer. The transformer comprises windings for phase shifting by fifteen electrical degrees the three-phase AC current outputs from each quadrant with respect to the other quadrants. The twelve-phase to three-phase transformer provides for summing and canceling harmonic currents in square wave currents generated by the inverter means. The circuit breaker means comprises a first breaker means provided for each of the three-phase AC current outputs of each quadrant and a second breaker means connected to a combination of the three-phase AC current outputs of said corresponding quadrant after passing through the first breaker means.

The objects are further accomplished by providing a method of converting DC power to AC power embedded in a photovoltaic (PV) array comprising the steps of arranging a plurality of PV cells in four quadrants of the array, providing in each of the quadrants at least one string of the PV cells for generating a DC voltage, converting the DC voltage to three-phase AC current outputs with inverter means connected to the string DC voltage in each string of the PV cells, and summing the three-phase AC current outputs from each quadrant and forming a three-phase AC high voltage output with means coupled to the output of the converter means. The step of converting the DC voltage to three-phase AC current outputs comprises the step of the inverter means generating a square wave having a dwell time at a zero cross-over point of the AC current outputs of 60 electrical degrees. The step of providing summing means further comprises the step of providing a twelve-phase to three-phase transformer. The step of providing the transformer comprises the step of providing windings for phase shifting by fifteen electrical degrees the three-phase AC current outputs from each quadrant with respect to the other quadrants. The twelve-phase to three-phase transformer comprises the step of providing for summing and canceling harmonic currents in square wave currents generated by the inverter means.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Referring to FIG. 1, a PV power station 10 as known in the prior art is shown comprising a PV array 12 for converting solar energy from the sun 11 to electrical energy which is connected to direct current (DC) switch gear 14 for collecting the DC voltages from strings of panels in the PV array 12. The DC voltage from the switch gear 14 is then fed to a DC to AC voltage style inverter 16 for power conditioning. After conversion from DC to three-phase (3φ) alternating current (AC) by inverter 16, the AC lines are coupled to a power transformer 20 via low voltage (LV) AC switch gear 18. The power transformer 20 generates the 3φ high voltage AC which is connected to high voltage (HV) AC switch gear 22 for transmission over the power lines 24.

Figure 3:
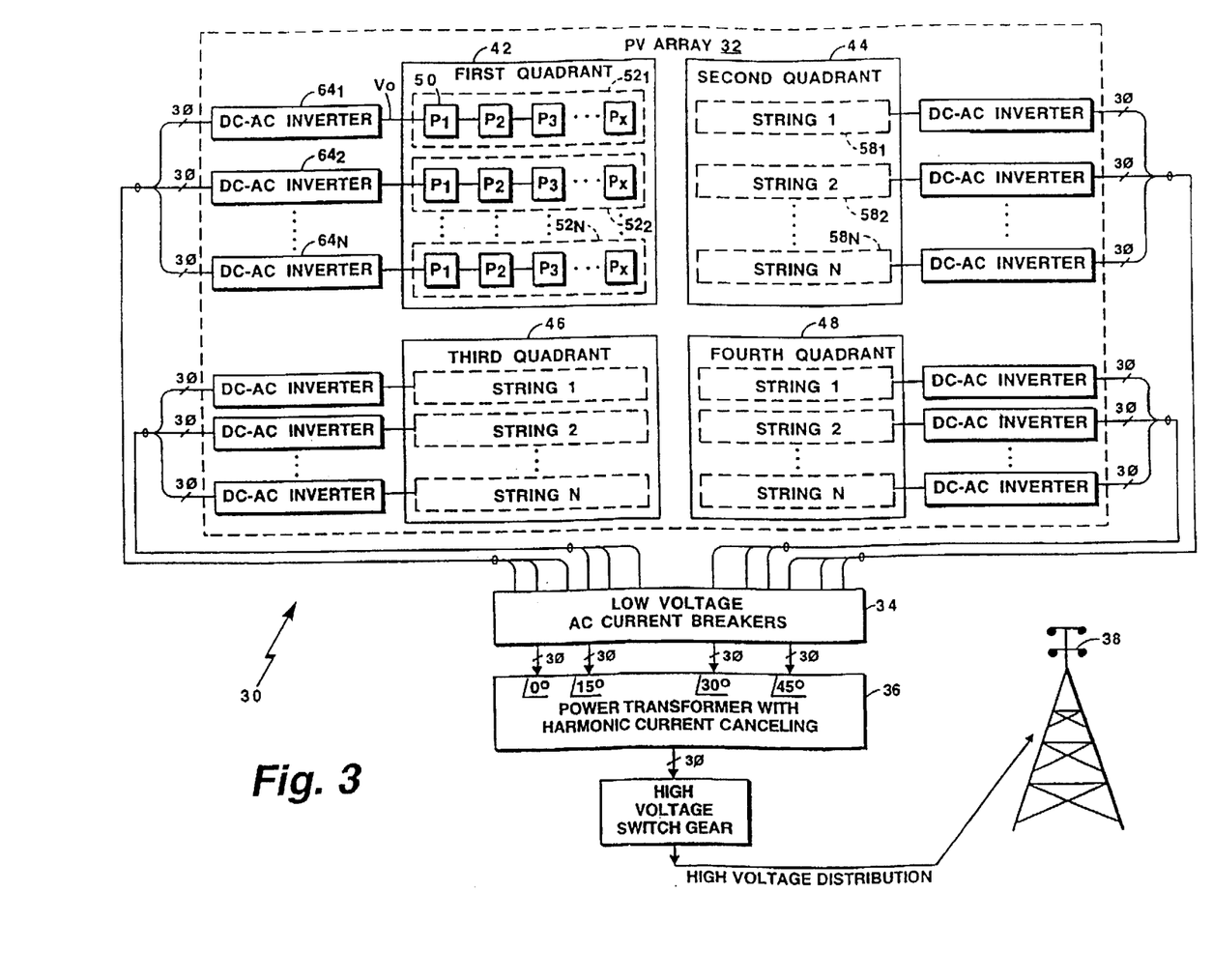
FIG. 3 is a block diagram of the PV array of the photovoltaic power station of FIG. 2.

Referring now to FIG. 2 and FIG. 3, an improved PV power station 30 according to the present invention is shown. A PV array 32 receives radiant energy from the sun 11 and converts it into electrical energy. The PV array 32 of FIG. 2 comprises a plurality of integral DC-AC square wave current inverters, the current being derived from the inherent current limiting characteristics of the PV cells 50 in the PV array 32, each of which generates three-phase AC currents. The 3φ AC currents from the inverters are connected to low voltage AC switch gear 34 or circuit breakers that feed such AC currents to a power transformer 36 which combines the AC currents from each DC to AC inverter of each quadrant 42, 44, 46, 48 of the PV array 32 and generates a 3φ AC high voltage. High voltage switch gear 37 switches the 3φ high voltage on and off transmission lines 38 of a power grid. Hence, the PV power station 30 of FIG. 2 eliminates in FIG. 1 the likelihood of a single point failure of the single point sinewave voltage power conditioning inverter 16 and eliminates associated DC power collection switch gear 14 which includes capacitors connected to the DC needed for the voltage style inverter, and blocking diodes for the PV string source circuits.

Referring to FIG. 3, a block diagram of the PV array 32 is shown. The PV array 32 is divided into 4 quadrants 42, 44, 46 and 48. Each quadrant comprises a plurality of strings $52_1-52_N$, of individual cells 50 connected in series. For example, string $52_1$ comprises the series of cells $P_1+P_2+P_3+ \ldots P_X$. The number of cells 50 in a string $52_1$ is determined by the required voltage at the output of the string $52_1$. Each string $52_1-52_N$, is connected to a low frequency DC to AC inverter $64_1-64_N$ which converts the DC voltage to 3φ AC voltages or currents. The number of strings $52_1-52_N$ in a quadrant 42 is determined by the power requirements of the power station 30. The minimum number of strings in such a power station would be four or one string per quadrant so increments of power occur by adding groups of four strings (one string in each quadrant). The voltage output $V_O$ from the string $52_1$ is connected to the integral DC-AC inverter $64_1$ and the same occurs with the other strings in all four quadrants 42-48. Hence, the power collection from each of the AC-DC inverters $64_1-64_N$ coupled to a corresponding one of the strings $52_1-52_N$ of the PV array 32 is in the form of 3φ AC currents. The 3φ AC current outputs from each inverter in each quadrant 42-48 are in phase with each other. The 3φ AC output of each embedded string inverter of a quadrant is phase shifted with respect to the other quadrants by an electrical angle of 15 degrees, which is effected by the voltage from transformer 36 windings being 15 degrees apart. This multiphasing of the inverter outputs from each quadrant 42, 44, 46, 48, produces sinusoidal current of the desired purity of no more than 5% THD and 3% for individual harmonics from square wave currents of the DC to AC inverters $64_1-64_N$ when combined in the 12φ to 3φ transformer 36 as previously described.

Figure 4:
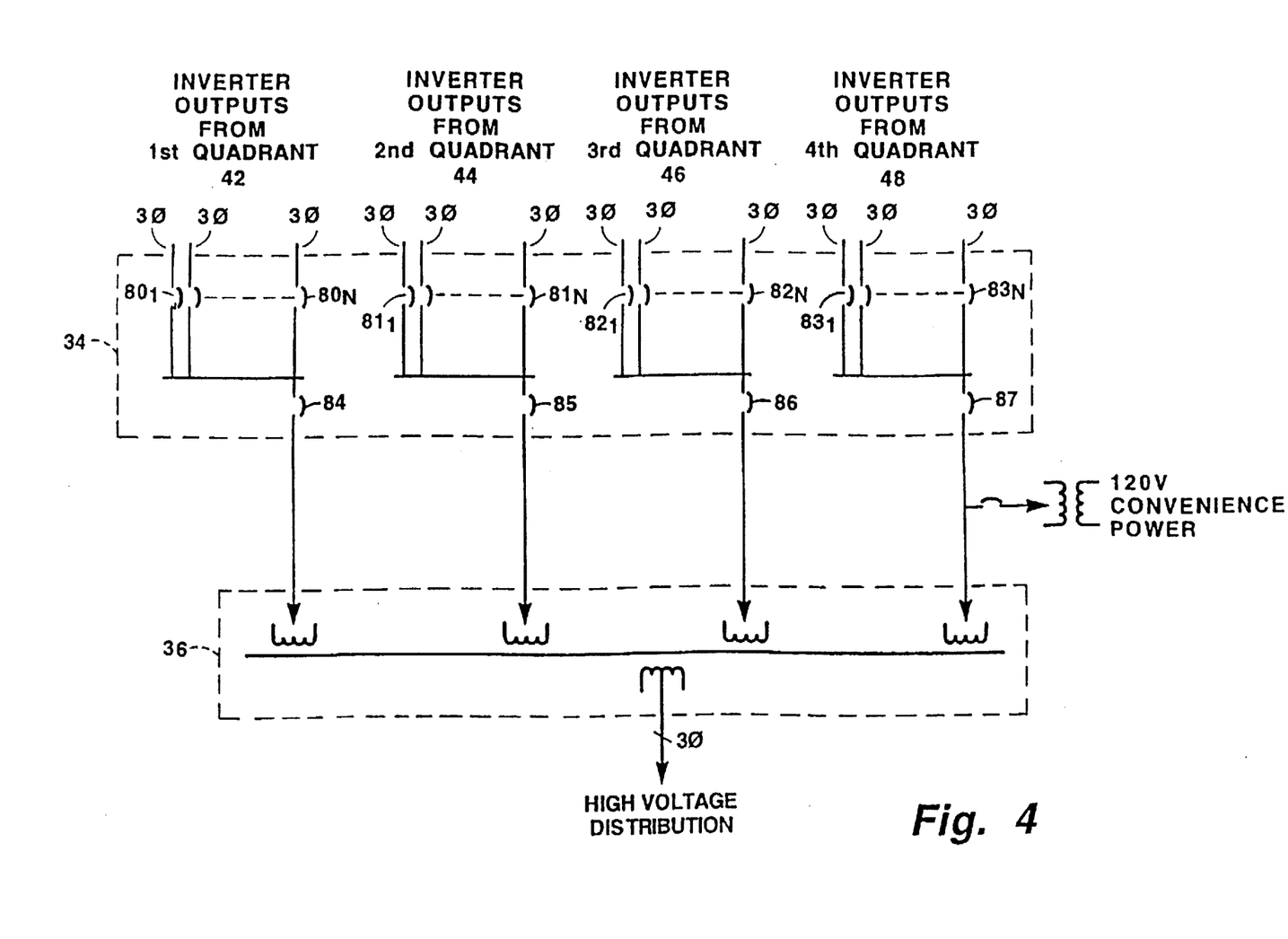
FIG. 4 is a diagram illustrating the connection of 3φ inverter outputs to a transformer via AC circuit breakers.

Referring to FIG. 3 and FIG. 4, the 3φ AC currents from each DC to AC inverter $64_1-64_N$ of the first quadrant 42 are fed to a manual circuit breakers $80_1-80_N$ in the low voltage AC circuit breakers 34 and on the other side of such circuit breakers 34 the inverter outputs are combined into 3φ AC voltages of the first quadrant. The 3φ AC currents from the DC-AC inverters of the second quadrant 44, third quadrant 46 and fourth quadrant 48 are similarly connected to manual circuit breakers and combined such that there are four 3φ AC currents, and each of these currents are connected to a circuit breaker 84-87 which may be manually operated or remote control operated. The four 3φ AC currents from the AC circuit breakers 34 are connected to a 12-phase to 3-phase power transformer 36 where the array power is automatically summed, and a 3φ phase AC high voltage generated. This high voltage is connected through the high voltage switch gear 37 to the utility transmission lines 38. The 12-phase to 3-phase power transformer 36 not only provides for a summation of the AC power collected from the four quadrants 42, 44, 46, 48 and a voltage transformation to match the voltage utility of the transmission line 38, but also provides for cancellation of harmonic current from the 3φ AC outputs of the individual PV array quadrants 42-48, provides for phase reference and synchronization of the individual quadrants 42-48 of AC output voltages of PV array 32, and provides for DC isolation of the PV array 32.

Referring again to FIG. 3, an embodiment of the power system 30 for delivering 375 KW minimum AC to a power grid 38 comprises a PV array 32 having 8 strings of PV cells 50 in each quadrant of said array 32. Each one of eight DC-AC inverters $64_1-64_N$ is connected to one of the eight strings $52_1-52_N$ of PV cells in the first quadrant 42 and similarly in each one of the other three quadrants 44, 46, 48. This connection of the DC-AC inverters $64_1-64_N$ is made right at the quadrant 42-48 of the PV array 32, which results in the term embedded power conditioning.

Figure 5:
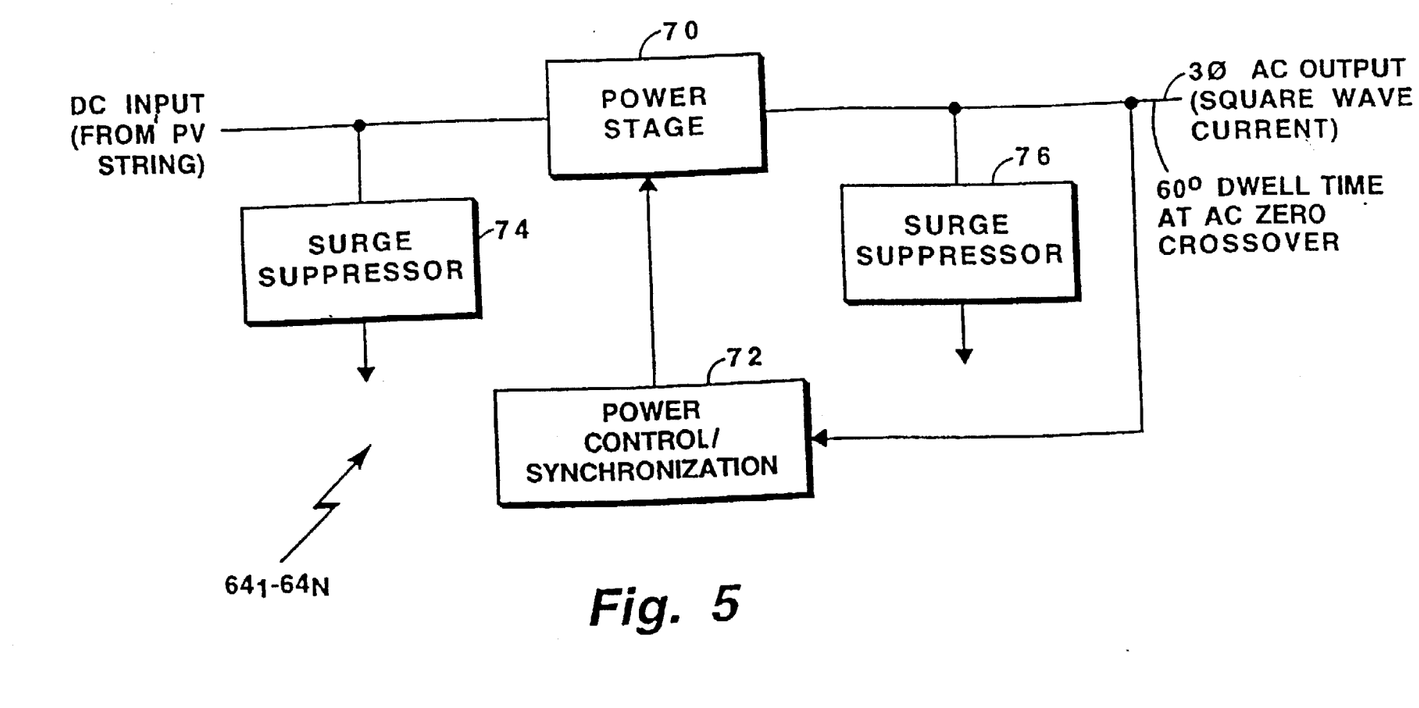
FIG. 5 is a block diagram of the DC to AC inverter of FIG. 3.

Referring now to FIG. 5, a block diagram of the square wave DC to AC inverter $64_1-64_N$ is shown comprising a power control 72 coupled to a power stage 70. A metal oxide varistor (MOV) 24 is connected to the DC input from the PV string output and an MOV 26 is connected to the 3φ AC output of the DC to AC inverter $64_1-64_N$. The MOV 24, 26 act as surge suppressors. The power stage 70 comprises six semiconductor switches, not shown but known to one of ordinary skill in the art, that convert the DC input power from the PV string 50 to 3φ AC power. These switches are controlled by the power control 72 that senses the 3φ AC voltage at the output of the inverter $64_1-64_N$ and synchronizes the switches such that the current is synchronous with the 3φ AC voltage from the 12φ to 3φ transformer 36 that connects the power to the AC lines 38. The power stage 70 may be embodied by Model TT B6C IION manufactured by EUPEC Company of Lebanon, N.J. The power control 72 may be embodied by Model FCOG-6100 manufactured by ENERPRO Company of Goleta, Calif.

The square wave inverter $64_1$ is the most efficient configuration for an inverter. Usually this simple efficient configuration does not suffice for the multitude of applications for which inverters are used due to more complex requirements of the applications. The square wave inverter $64_1$ is efficient because it consists of the minimum number of components needed to convert DC to AC. The components consist of the semiconductor switches and the drive for the switches. The switches may be SCRs, IGBTs, FETs, Bipolar transistors, or GTOs and the particular semiconductor switch style selected will be dependent on the voltage, current and frequency at which the inverter is intended to operate. With the moderate voltage, low frequency and moderate current requirements of approximately 400 volts at 40 amps for each of the inverters for the 32 string configuration of inverters in the present embodiment, the demands on these switches are minimal and can be provided by a host of catalog assemblies and components known to one of ordinary skill in the art.

The losses for the square wave inverter 64 can be computed as follows: The voltage operation of the PV strings is calculated to be nominal 400 volts DC. The voltage drop (conduction losses) of switches in a power bridge of the inverter is estimated to be three to four volts. Four volts represent 1% at 400 volts, yielding 1% losses. The switching frequency of the switches is at the 60 HZ line frequency, hence, the switching losses are considered to be negligible. The power for the switch drive and housekeeping for the inverter is less than 20 watts. These total inverter losses represent less than 2% of the inverter output, but have been rounded out to 2% to arrive at the inverter efficiency of 98%.

Figure 6:
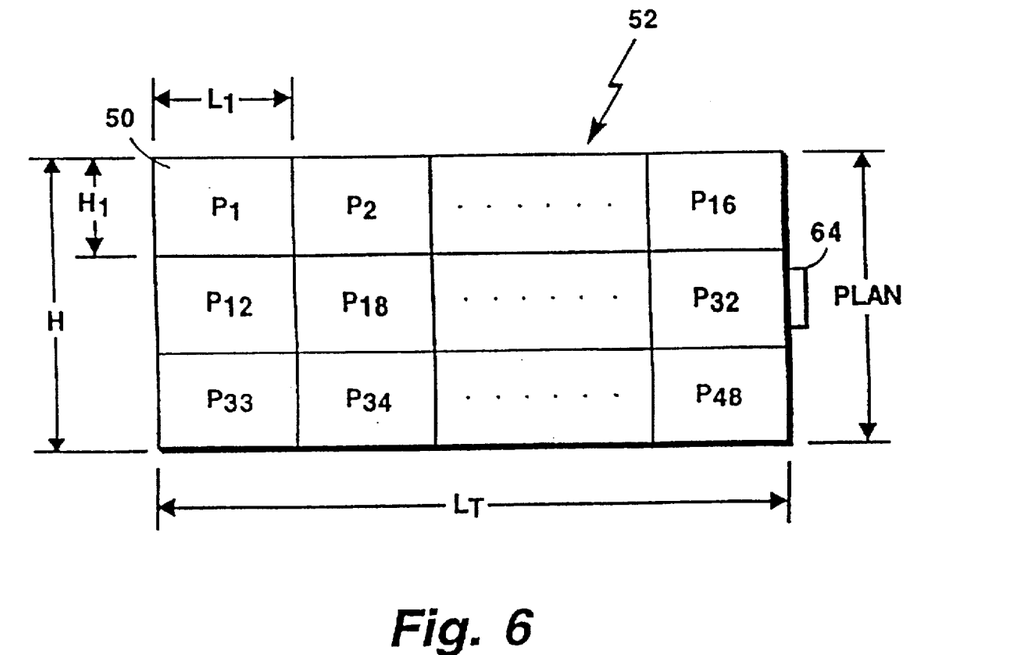
FIG. 6 shows a layout of a string of 48 PV cells or panels $P_1$ to $P_{48}$ arranged in a 3×16 configuration.
Figure 7:
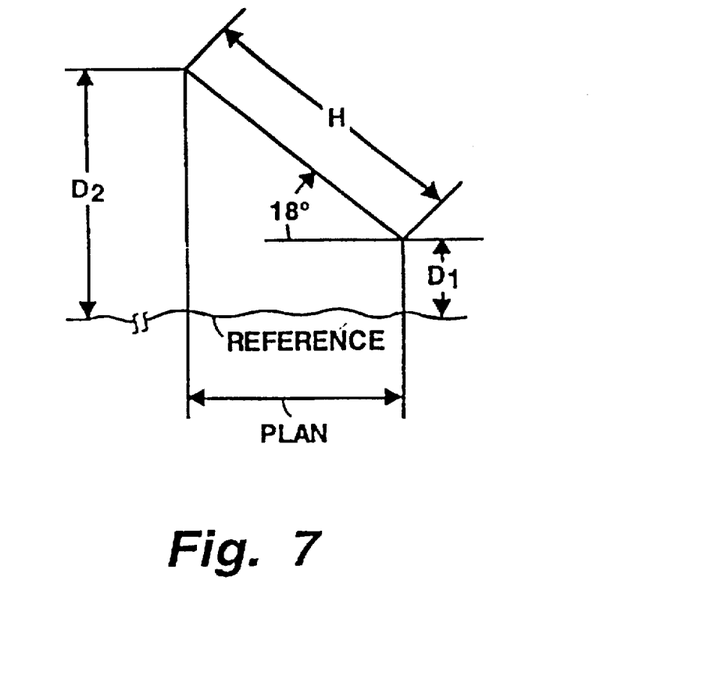
FIG. 7 shows a side view of the 3×16 configuration in FIG. 6 of the string of 48 PV cells or panels $P_1$ to $P_{48}$ mounted at an 18° angle.

Referring now to FIG. 6 and FIG. 7, FIG. 6 shows a layout for a string $52_1$ of PV cells $P_1$ to $P_{48}$ connected in series for the power system 30 comprising 32 strings. The string $52_1$ comprises PV cells or panels $P_1$ to $P_{48}$ arranged in a 3×16 configuration with panels coupled on 6 foot side, $L_1$. The total length ($T_1$) of 16 panels is 96 feet since each panel such as $P_1$ is 4 feet high ($H_1$) and 6 feet long ($L_1$). Each panel may be embodied by a model GP-8 manufactured by ASE Company, of Billerica, Mass. This string $52_1$ generates 400 volts DC using panels $P_1$ to $P_{48}$ in series and 37 amps DC per string are generated resulting in 12.72 KW per string.

FIG. 7 shows a side view of the 3×16 panel configuration of string $52_1$ shown in FIG. 6 which is mounted 2 feet ($D_1$) above a reference at an 18° angle from the horizontal. At this 18° angle the top of the 3×16 panel configuration is 5.7 feet ($D_2$) above the reference.

The output of the strings $52_1$–$52_8$ of the 32 string embodiment are connected through wiring, inverters and high voltage transformer 36 to the 12.47 KV utility line 38 and delivers 383.6 KW system power output to the utility line 38 based on a system efficiency of 95.08%. This output to the utility line 38 is based on wiring losses of 1%, inverter losses of 2% and transformer losses of 2%. Hence, the system efficiency=0.99×0.98×0.98×100%=95.08%. (Array power x system efficiency=system power output).

Referring again to FIG. 6, the PV cells or panels $P_1$ to $P_{48}$ are shown for one string of the 32 string embodiment. Hence, for the 8 strings in each of the 4 quadrants 42, 44, 46, 48 a total of 48×32=1536 PV panels are required. The electrical specifications at peak power for the PV panels are shown in the following table:

| Conditions | Power | Current | Voltage |
| --- | --- | --- | --- |
| STC 1000 w/m², Tc = 35° C. | 300(+/−4%) | 35.7(+/−4%) | 8.4(+/−4%) |
| PTC 1000 w/m², Tc = 25° C. | 265(+/−4%) | 36.6(+/−4%) | 7.6(+/−4%) |

The table shows that for PTC (PVUSA Test Conditions), the PV cell or panel is rated at 265 watts. The four quadrants of output power from the PV cells or panels is determined as follows:

PV Array Power=Total Number of Panels×Power/Panel× Panel Mismatch %
PV Array Power=1536 panels×265 w/panel×0.991
PV Array Power=403.4 KW The 403.4 KW yields greater that the 375 KW required when applying the system efficiency of 95.08%.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A photovoltaic (PV) array including embedded power conditioning comprising:

a plurality of PV cells arranged in strings, each string generating a DC voltage;

inverter means, connected to said string, for converting said DC voltage to three-phase AC current outputs; and means coupled to said output of said inverter means for summing said three-phase AC current outputs from each string and forming a three-phase AC high voltage output, wherein said inverter means generates a square wave current having a dwell time at a zero cross-over point of said AC voltage outputs of 60 electrical degrees.

2. A photovoltaic (PV) array including embedded power conditioning comprising:

a plurality of PV cells arranged in strings, each string generating a DC voltage;

inverter means, connected to said string, for converting said DC voltage to three-phase AC current outputs; and means coupled to said output of said inverter means for summing said three-phase AC current outputs from each string and forming a three-phase AC high voltage output, wherein said inverter means comprises a square wave inverter, wherein said square wave inverter comprises a six-pulse three-phase bridge configuration.

3. A photovoltaic (PV) array including embedded power conditioning comprising:

a plurality of PV cells arranged in strings, each string generating a DC voltage;

inverter means, connected to said string, for converting said DC voltage to three-phase AC current outputs; and means coupled to said output of said inverter means for summing said three-phase AC current outputs from each string and forming a three-phase AC high voltage output, wherein said summing means comprises a poly-phase to three-phase transformer.

4. The PV array as recited in claim 3 wherein said transformer comprises windings to introduce equal phase shifts between said three-phase AC current outputs from each string with respect to said other string.

5. The PV array as recited in claim 3 wherein said poly-phase to three-phase transformer provides for summing and canceling harmonic currents in square wave currents generated by said inverter means.

6. A power system comprising:

a photovoltaic (PV) power source;

said photovoltaic power source comprising an array of PV cells arranged in segments;

each of said segments comprising at least one string of said PV cells for generating a DC voltage;

inverter means, connected to said string, for converting said DC voltage to three-phase AC current outputs;

circuit breaker means, coupled to each of said three-phase AC current outputs from each inverter means in each segments of said PV array, for protecting each string of said PV array; and means, coupled to said circuit breaker means for summing said three-phase AC current outputs from each segment and forming a three-phase AC high voltage output of said power system, wherein said inverter means generates a square wave current having a dwell time at a zero cross-over point of said AC current outputs of 60 electrical degrees.

7. A power system comprising:

a photovoltaic (Pv) power source;

said photovoltaic power source comprising an array of PV cells arranged in segments;

each of said segments comprising at least one string of said PV cells for generating a DC voltage;

inverter means, connected to said string, for converting said DC voltage to three-phase AC current outputs;

circuit breaker means, coupled to each of said three-phase AC current outputs from each inverter means in each segments of said PV array, for protecting each string of said PV array; and means, coupled to said circuit breaker means for summing said three-phase AC current outputs from each segment and forming a three-phase AC high voltage output of said power system, wherein said inverter means comprises a square wave inverter, wherein said square wave inverter comprises a six-pulse three-phase bridge configuration.

8. A power system comprising:

a photovoltaic (PV) power source;

said photovoltaic power source comprising an array of PV cells arranged in segments;

each of said segments comprising at least one string of said PV cells for generating a DC voltage; inverter means, connected to said string, for converting said DC voltage to three-phase AC current outputs;

circuit breaker means, coupled to each of said three-phase AC current outputs from each inverter means in each segments of said PV array, for protecting each string of said PV array; and means, coupled to said circuit breaker means for summing said three-phase AC current outputs from each segment and forming a three-phase AC high voltage output of said power system, wherein said summing means comprises a poly-phase to three-phase transformer.

9. The power system as recited in claim 8 wherein said transformer comprises winding to introduce equal phase shifts between said three-phase AC current outputs from each segment with respect to said other segments.

10. The power system as recited in claim 8 wherein said poly-phase to three-phase transformer provides for summing and cancelling harmonic currents in square wave currents generated by said inverter means.

11. A power system comprising:

a photovoltaic (PV) power source;

said photovoltaic power source comprising an array of PV cells arranged in segments;

each of said segments comprising at least one string of said PV cells for generating a DC voltage;

inverter means, connected to said string, for converting said DC voltage to three-phase AC current outputs;

circuit breaker means, coupled to each of said three-phase AC current outputs from each inverter means in each segments of said PV array, for protecting each string of said PV array; and means, coupled to said circuit breaker means for summing said three-phase AC current outputs from each segment and forming a three-phase AC high voltage output of said power system, wherein said circuit breaker means comprises a first breaker means provided for each of said three-phase AC current outputs of each segment and a second breaker means connected to a combination of said three-phase AC current outputs of said corresponding segment after passing through said first breaker means.

12. A power system comprising:

a photovoltaic (PV) power source;

said photovoltaic power source comprising an array of PV cells arranged in segments;

each of said segments comprising at least one string of said PV cells for generating a DC voltage;

inverter means, connected to said string, for converting said DC voltage to three-phase AC current outputs;

circuit breaker means, coupled to each of said three-phase AC current outputs from each inverter means in each segments of said PV array, for protecting each string of said PV array; and means, coupled to said circuit breaker means for summing said three-phase AC current outputs from each segment and forming a three-phase AC high voltage output of said power system, wherein a voltage output of said summing means via said circuit breaker means is utilized to synchronize said inverter means to the voltage output of said summing means.

13. A method of converting DC power to AC power embedded in a photovoltaic (PV) array comprising the steps of:

arranging a plurality of PV cells in multiple strings, each string generating a DC voltage;

converting said DC voltage to three-phase AC current outputs; and summing said three-phase AC current outputs from each string and forming a three-phase AC high voltage output, wherein said step of converting said DC voltage to three-phase AC current outputs comprises the step of generating a square wave having a dwell time at a zero cross-over point of said AC current outputs of 60 electrical degrees.

14. A method of converting DC power to AC power embedded in a photovoltaic (PV) array comprising the steps of:

arranging a plurality of PV cells in multiple strings, each string generating a DC voltage;

converting said DC voltage to three-phase AC current outputs; and summing said three-phase AC current outputs from each string and forming a three-phase AC high voltage outputs, wherein said step of providing summing means further comprises the step of providing a poly-phase to three-phase transformer.

15. The method as recited in claim 14 wherein said step of providing said transformer comprises the step of providing windings to introduce equal phase shifts between said three-phase AC current outputs from each string with respect to said other strings.

16. The method as recited in claim 14 wherein said step of providing said poly-phase to three-phase transformer comprises the step of providing summing and canceling harmonic currents in the square wave currents.

* * * * *